(12) United States Patent
Wheeler et al.

(10) Patent No.: US 7,913,762 B2
(45) Date of Patent: Mar. 29, 2011

(54) METHOD OF FRACTURING USING ULTRA LIGHTWEIGHT PROPPANT SUSPENSIONS AND GASEOUS STREAMS

(75) Inventors: Richard S. Wheeler, Crosby, TX (US); Chandler C. Newhall, Brighton, CO (US); Roger R. Myers, Cranberry Township, PA (US); Brian Ward, The Woodlands, TX (US); Brian B. Beall, Spring, TX (US); Harold D. Brannon, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/180,219

(22) Filed: Jul. 25, 2008

(65) Prior Publication Data

US 2010/0018707 A1    Jan. 28, 2010

(51) Int. Cl.
*E21B 43/26*    (2006.01)
*E21B 43/267*   (2006.01)

(52) U.S. Cl. .................................. 166/308.2; 166/280.1

(58) Field of Classification Search .................. None
See application file for complete search history.

(56) References Cited

U.S. PATENT DOCUMENTS

| | | | | |
|---|---|---|---|---|
| 3,384,176 A * | 5/1968 | Huitt ........................ | 166/308.1 |
| 4,212,354 A * | 7/1980 | Guinn ........................ | 166/303 |
| 4,354,552 A | 10/1982 | Zingg | |
| 4,480,696 A | 11/1984 | Almond et al. | |
| 4,519,455 A | 5/1985 | Holtmyer et al. | |
| 4,627,495 A * | 12/1986 | Harris et al. ............... | 166/280.1 |
| 4,830,794 A | 5/1989 | Edgley et al. | |
| 5,069,283 A * | 12/1991 | Mack ........................ | 166/308.6 |
| 5,258,137 A * | 11/1993 | Bonekamp et al. ........... | 516/11 |
| 5,305,832 A | 4/1994 | Gupta et al. | |
| 5,424,285 A | 6/1995 | Stacy et al. | |
| 5,515,920 A | 5/1996 | Luk et al. | |
| 5,558,160 A | 9/1996 | Tudor | |
| 6,017,855 A | 1/2000 | Dawson et al. | |
| 6,059,034 A | 5/2000 | Rickards et al. | |
| 6,330,916 B1 | 12/2001 | Rickards et al. | |
| 6,364,018 B1 | 4/2002 | Brannon et al. | |
| 6,410,489 B1 | 6/2002 | Zhang et al. | |
| 6,439,309 B1 | 8/2002 | Matherly et al. | |
| 6,509,300 B1 | 1/2003 | Gupta | |
| 6,729,409 B1 | 5/2004 | Gupta et al. | |
| 6,749,025 B1 | 6/2004 | Brannon et al. | |
| 6,772,838 B2 | 8/2004 | Dawson et al. | |
| 6,875,728 B2 * | 4/2005 | Gupta et al. ................ | 507/240 |
| 7,049,436 B2 | 5/2006 | Gupta et al. | |
| 7,201,227 B2 | 4/2007 | Gupta et al. | |
| 7,210,528 B1 * | 5/2007 | Brannon et ................. | 507/140 |
| 7,726,404 B2 * | 6/2010 | Kubala et al. .............. | 166/308.2 |
| 7,735,551 B2 | 6/2010 | Vozniak et al. | |
| 2004/0040708 A1 * | 3/2004 | Stephenson et al. ......... | 166/280.1 |
| 2005/0028979 A1 | 2/2005 | Brannon et al. | |
| 2006/0065398 A1 | 3/2006 | Brannon et al. | |
| 2008/0217012 A1 * | 9/2008 | Delorey et al. ............. | 166/300 |
| 2009/0209438 A1 * | 8/2009 | Thieme et al. .............. | 507/219 |

* cited by examiner

*Primary Examiner* — Zakiya W Bates
*Assistant Examiner* — Angela M Ditrani
(74) *Attorney, Agent, or Firm* — John Wilson Jones; Jones & Smith, LLP

(57) ABSTRACT

In a method of hydraulically fracturing a hydrocarbon-bearing subterranean formation, a proppant stage is introduced into the fracture which contains a gaseous fluid and an ultra lightweight proppant suspended in a viscosified aqueous fluid. The gaseous fluid of the proppant stage contains at least about 90 volume percent of the combination of gaseous fluid and aqueous fluid. A pad fluid may first be introduced into the formation, the pad fluid containing a gaseous fluid and, optionally, an aqueous fluid. The gaseous fluid of the pad fluid mixture typically contains at least 70 volume percent of the mixture.

47 Claims, No Drawings

METHOD OF FRACTURING USING ULTRA LIGHTWEIGHT PROPPANT SUSPENSIONS AND GASEOUS STREAMS

FIELD OF THE INVENTION

The invention relates to a method of hydraulic fracturing a subterranean formation by introducing into the formation a proppant stage containing a gaseous fluid and an ultra lightweight (ULW) proppant suspended in a viscosified or gelled aqueous fluid.

BACKGROUND OF THE INVENTION

A common method of increasing productivity of a hydrocarbon-bearing formation penetrated by a wellbore is to subject the formation to stimulation techniques, such as hydraulic fracturing. In hydraulic fracturing, a liquid, gas or two-phase fluid, generally referred to as a fracturing fluid, is introduced into the formation. The fracturing fluid, typically water or oil-based, is introduced into the wellbore penetrating the formation at a sufficient pressure and flow rate to create fractures in the subterranean formation. A proppant is introduced into the fractures to keep the fractures open. The propped fracture provides larger flow channels through which an increased quantity of a hydrocarbon may flow, thereby increasing the productive capability of the well.

Recently, ultra lightweight (ULW) particulates have been reported for use as proppants. The requisite fluid velocity to maintain proppant transport within the fracture is reduced by the use of ULW proppants. In light of reduced fluid velocity, a greater amount of the created fracture area may be propped. Exemplary of such ULW proppants are those set forth in U.S. Patent Publication No 2008/0087429 A1, herein incorporated by reference.

Many times, fracturing proceeds by first introducing into the formation a "pad" or "spearhead" fluid. Pad or spearhead fluids are fracturing fluids used to initiate fractures and are typically free of proppant. They normally exhibit relatively low viscosity. Following the initiation of the fracture, fracturing fluid containing proppant is then introduced into the formation.

Fracturing fluids which are predominately liquid typically exhibit poor transport properties. High pumping rates are normally required in order to impart a sufficient velocity for placement of the proppant in the fracture. In such treatments, the proppant tends to settle, forming a 'proppant bank', as the linear slurry velocity falls as a function of the distance from the wellbore. This effect is further believed to result in reduced stimulation efficiency as the effective propped length is relatively short.

Further complications arise from the use of liquid fracturing fluids because of the need to recover the fracturing fluid. Such fracturing fluids typically contain components which are damaging to the environment and/or affect the production of oil and/or gas from the reservoir. For instance, water soluble polymers, such as guar gum or a derivative thereof, are often used in fracturing fluids to provide the requisite flow characteristics to the fluid and to suspend proppant particulates. When pressure on the fracturing fluid is released and the fracture closes around the proppant, water is forced out and the water-soluble polymer forms a filter cake. This filter cake can prevent oil or gas flow if it is not removed. Further, emulsions may be generated from fracturing fluids which impede flow of produced gas and/or oil.

The recovery of fracturing fluids and the removal of filter cakes is normally accomplished by reducing the viscosity of the fluid with a breaker such that the fracturing fluid flows naturally from the formation under the influence of hydrostatic pressure. Historically, the application of breakers in fracturing fluids at elevated temperatures, i.e., above about 120-130° F., has been a compromise between maintaining proppant transport and achieving the desired fracture conductivity, measured in terms of effective propped fracture length. Conventional oxidative breakers react rapidly at elevated temperatures, potentially leading to catastrophic loss of proppant transport. Encapsulated oxidative breakers have experienced limited utility at elevated temperatures due to a tendency to release prematurely or to have been rendered ineffective through payload self-degradation prior to release.

Alternative fracturing treatments have been explored by incorporating gaseous materials into fracturing fluids in order to form a gas phase at the wellhead or at the formation being fractured or both. In "foam fracturing", a foam is generated of a desired Mitchell quality which is then introduced through the wellbore into the formation. For instance, U.S. Pat. No. 3,937,283 discloses a hydraulic fracturing process employing a foam formed of a gas (such as nitrogen, carbon dioxide, air or a hydrocarbon gas) and a liquid (such as water or an oil base liquid). The foam is characterized as having a Mitchell quality within the range of 52.4% to 99.99% and preferably between the range of 60% to 85%. The pressure at which the foam is pumped into the well is such that a fracture of the hydrocarbon-bearing formation is created. The foam easily exits the well when pressure is released from the wellhead. The reduction in pressure causes the foam to expand.

Conventional fracturing operations, including those wherein a gaseous material is incorporated into the fracturing fluid, have been found to be inappropriate for the creation of partial monolayer fractures. Partial monolayer fractures are created by a proppant pack having proppant particulates widely spaced from each other, the proppant pack exhibiting the requisite strength to hold fractures open and thus allow the production of hydrocarbons from the formation.

The efficiency of a partial monolayer fracture is dependent on fracture porosity and conductivity once the fracturing operation is stopped and production commences. Fracture porosity is dependent upon the area concentration of the proppant placed, the proppant size, and mechanical properties, e.g, modulus, of the proppant. It is important that proppant packs forming partial monolayer fractures exhibit high porosity. The high conductivity of the created fractures is attributable to the ability of produced fluids to flow around the widely spaced proppant particulates instead of being confined to the relatively small interstitial spaces evidenced in the packed proppant bed.

Alternative hydraulic fracturing methodologies have been sought which provide increased conductive fracture areas and increased effective propped fracture lengths. Such alternative methodologies need to render improved stimulation efficiency and well productivity and provide a means to create partial monolayer fractures. In addition, such methodologies need to minimize or eliminate the reservoir damage evidenced from the use of liquid fracturing fluids.

SUMMARY OF THE INVENTION

The invention relates to a method of hydraulically fracturing a hydrocarbon-bearing subterranean formation by introducing into the fracture at least one proppant stage which contains a gaseous fluid and an ultra lightweight (ULW) proppant suspended in a viscosified or surfactant gelled aqueous fluid. The gaseous fluid of the proppant stage contains at least about 85 volume percent of the combination of gaseous fluid and aqueous fluid. The ULW proppant has an apparent specific gravity less than or equal to 2.45.

The ULW proppant is suspended in the viscosified or surfactant gelled aqueous fluid prior to being admixed with the gaseous fluid. The amount of proppant suspended in the surfactant gelled aqueous system or viscosified aqueous fluid is that amount sufficient to create a partial monolayer in the fracture.

The pumping of the proppant stage may be preceded by introduction of a pad fluid. The pad fluid contains a gaseous fluid and is introduced into the formation at a pressure sufficient to initiate a fracture. The pad fluid may further contain an aqueous fluid. Typically, the gaseous fluid of the pad fluid mixture comprises at least 70 volume percent of the pad fluid mixture. The pad fluid may further contain a proppant, preferably an ULW proppant having an apparent specific gravity less than or equal to 2.25.

The disclosed methodology improves proppant placement and conductive fracture area, while minimizing fracture conductivity damage.

DETAILED DESCRIPTION OF THE PREFERRED EMBODIMENTS

The fracturing method described herein consists of introducing into the fracture within a formation a proppant stage containing a gaseous fluid and a viscosified aqueous fluid in which the proppant is suspended. The proppant stage is created by the mixing of the gaseous fluid and the viscosified aqueous fluid containing suspended proppant at the wellhead.

The amount of gaseous fluid contained in the proppant stage fluid is at least about 85 volume percent, i.e., the combination of gaseous fluid and aqueous fluid, which contains the proppant, is at least about 85 volume percent. Typically, the amount of gaseous fluid in the proppant stage fluid is greater than or equal to 90 volume percent. Usually, at least about 95 percent of the proppant particulates in the proppant stage are not in contact with other proppant particulates in the created fracture.

The described method of fracturing creates a large conductive fracture area in the formation with a minimal amount of liquid fluid. The propped fracture area exhibits high conductivity using a minimal volume of liquid fluid in the proppant stage. As a result, there is minimal, if any, damage to conductivity. Since the proppant stage is composed predominately of gas, the amount fracturing fluid that must be recovered is minimal. Further, damage to the reservoir, often affiliated with the use of liquid fracturing fluids, is minimized or eliminated. For instance, since the amount of liquid in the proppant stage fluid is minimized, damage caused by polymers, emulsions and water blocks which routinely results with liquid fracturing fluids is dramatically reduced, if not eliminated. Environmental impact from the fracturing method disclosed herein is thereby reduced.

The disclosed methodology further provides easier movement of reservoir fluids (gas and/or oil), especially in low pressure or under-pressured reservoirs. When liquid fracturing fluids are employed, the liquid column in the casing and wellbore imparts a hydrostatic pressure on the reservoir, necessitating that the reservoir has sufficient greater pressure than the applied hydrostatic pressure to push the fracturing fluid out of the wellbore. In light of the low amount of liquid used in the inventive fracturing fluid, the amount of hydrostatic pressure to be overcome, if any, to allow flow of oil or gas out of the reservoir is minimized or eliminated. In addition, since the disclosed methodology uses less liquid and proppant in the fracturing fluid than conventional fracturing processes, equipment demands are decreased and operational costs are reduced.

Further, the method of fracturing a hydrocarbon-bearing subterranean formation, as defined by the invention, is capable of creating a partial monolayer of proppant in the fracture upon closure of the fracture. Properly placed, the partial monolayer provides the most efficient conductivity for the amount of proppant employed. The partial monolayer is created by the use of a small amount of aqueous fluid in the proppant stage; the fluid in the proppant stage being mostly an inert gas, such as nitrogen. Proppants in partial monolayers further are generally less susceptible to flowback in light of their improved confinement. Further, produced fluids flowing through a partial monolayer have a reduced tendency of proppant flowback during production of oil and/or gas from the well. Fluid recovery after treatment is thereby greatly enhanced for high well productivity.

In the method defined herein, a ULW proppant is first slurried in an aqueous fluid. A slurry concentrate is preferred since it makes the operational procedure more logistically acceptable as a greater amount of proppant per given volume is made available on-site and in the vicinity of the blender/mixer. The ULW proppant is then suspended in a viscosified aqueous fluid prior to being admixed with the gaseous fluid. To do so, the ULW proppant slurry was introduced to the viscosified fluid at a temperature of less than 100° F. and agitated for about 30 minutes.

The amount of proppant suspended in the viscosified aqueous fluid is that amount sufficient to create a partial monolayer in the fracture. Prior to being suspended in the viscosified aqueous fluid, the concentration of ULW proppant in the aqueous fluid is normally between from about 2 to about 8 pounds per gallon of liquid (ppa).

The slurry, containing the ULW proppant, is introduced into a blender or mixer and a viscosifying agent is then added. The admixture is stirred until the proppant becomes suspended in the aqueous fluid. Vigorous agitation may be required to prevent gravity segregation of the proppant while the viscosifying agent is being introduced. The suspension may be batch-mixed or made on-the-fly. At least one high pressure pump is used to inject the proppant slurry into the wellhead.

The viscosifying agent may be a synthetic or natural polymer.

In a preferred embodiment, the viscosifying agent is a viscoelastic surfactant. Upon agitation, the ULW proppant becomes suspended in the viscoelastic surfactant as the viscoelastic surfactant commences gelation.

The amount of viscosifying agent added to the aqueous fluid containing the proppant is that amount sufficient to suspend the proppant in the resulting medium. Typically, the amount of viscosifying agent added to the aqueous fluid is from about 1 to about 15 gallons per thousand (gpt) of aqueous fluid.

Typically, the weight percent of proppant in the suspension is between from about 6 to about 55 weight percent, preferably between from about 19 to about 49 weight percent. Further, the requisite amount of proppant may be adjusted by varying the rate of gas introduced into the operation mixer/blender with the aqueous fluid or by varying the rate of proppant slurry into the mixer/blender. Typical downhole proppant concentrations are approximately 0.05 per gallon (ppg) of fluid in the proppant stage (including the gaseous phase) at downhole conditions of pressure and temperature and may increase to 0.5 ppg. The low concentration of proppant facilitates the ability to attain a very dispersed proppant distribution upon fracture closure and thus to obtain the desired partial monolayer. The injection rate of proppant slurry into the wellhead may be adjusted to obtain the desire downhole proppant concentration.

The fluid containing the suspended proppant is added to the gaseous stream. Typically, the gaseous stream is introduced directly at the wellhead and is concurrently admixed with the aqueous proppant suspension at the wellhead.

Suitable synthetic or natural polymers are those hydratable polymers which contain one or more functional groups, such as a hydroxyl, carboxyl, sulfate, sulfonate, amino or amido group. Preferred synthetic and natural polymers include polysaccharides, polyvinyl alcohols, polyacrylates (including the (meth)acrylates), polypyrrolidones, polyacrylamides (including (meth)acrylamides) as well as 2-acrylamido-2-methylpropane sulfonate and mixtures thereof.

Other suitable polysaccharides and derivatives are those which contain one or more monosaccharide units of galactose, fructose, mannose, glucoside, glucose, xylose, arabinose, glucuronic acid and pyranosyl sulfate. These include guar gums and derivatives thereof, locust bean gum, tara, xanthan, succinoglycan, scleroglucan and carrageenan.

Preferred viscosifying polymers may include crosslinkable polysaccharides, such as guar gums and derivatives, cellulose, starch, and galactomannan gums. Cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose.

Specific examples of polysaccharides useful with the present invention include, but are not limited to, guar gum, hydroxypropyl guar, carboxymethylhydroxypropyl guar and known derivatives of these gums.

Suitable surfactant based gels for use in practicing the invention may be prepared from viscoelastic surfactants containing an anionic surfactant and a cationic surfactant. A preferred viscoelastic surfactant is the combination of sodium xylene sulfonate, as anionic surfactant, and N,N,N-trimethyl-1-octadecammonium chloride, as cationic surfactant. Such viscoelastic surfactants are set forth in U.S. Pat. No. 6,468,945, herein incorporated by reference. The volume ratio of anionic surfactant:cationic surfactant is from about 1:4 to about 4:1.

Other suitable surfactant based gelled systems are those fluids which contain a $C_{10}$ to $C_{24}$ alkyl trialkyl quaternary ammonium aromatic salt admixed with an anionic surfactant, such as sodium xylene sulfonate. Such systems include those set forth in U.S. Patent Publication No. 20040138071, herein incorporated by reference. Typically, the volume ratio of cationic surfactant:anionic surfactant of such viscoelastic surfactants is between from about 1:1 to about 3:1. The alkyl group forming the alkylated moiety can be a $C_{10}$ to $C_{24}$ alkyl group, preferably a $C_{12}$ to a $C_{20}$ alkyl. In a most preferred embodiment, the alkyl group forming the alkylated moiety is a $C_{18}$ alkyl. The aromatic salt is preferably an aromatic salicylate or phthalate. The trialkyl moiety contains preferably from $C_1$ to $C_4$ alkyl groups, most preferably methyl. In a preferred mode, the surfactant is a gelled $C_{18}$ trimethyl quaternary ammonium phthalate or a gelled $C_{18}$ trimethyl quaternary ammonium salicylate.

Such $C_{10}$ to $C_{24}$ alkyl trialkyl quaternary ammonium aromatic salts may be formed by mixing a $C_{10}$ to $C_{24}$, preferably a $C_{18}$, alkyl trialkyl quaternary ammonium chloride with an alkali aromatic salt, such as a sodium salt of either salicylic acid or phthalic acid.

The ULW proppant has an apparent specific gravity (ASG) less than or equal to 2.45, generally is less than or equal to 2.25, typically less than or equal to 2.0, preferably less than or equal to 1.75, more preferably less than or equal to 1.25, most preferably less than or equal to 1.06. Such ULW proppants more easily facilitate the placement of partial monolayers within the formation.

Exemplary ULW proppants for use in the invention include naturally occurring material resistant to deformation, a synthetic polymeric particulate, a porous particulate treated with a non-porous penetrating coating and/or glazing material or a well treating aggregate of an organic lightweight material and a weight modifying agent. Such ULW proppants are disclosed in U.S. Patent Publication No 2008/0087429 A1, herein incorporated by reference.

Further, the ULW proppant may be a polyamide, such as those disclosed in US-2007-0209795 A1, herein incorporated by reference.

Further, the ULW proppant may be metallic spheres, such as those disclosed in U.S. Patent Publication No. 2008/0179057.

The ULW proppant may be any of those deformable particulates set forth in U.S. Patent Publication No. 2008/0182761 and U.S. Pat. No. 7,322,411, both of which are herein incorporated by reference.

Still preferred are synthetic polymers, such as polystyrene beads crosslinked with divinylbenzene. Such beads include those described in U.S. Patent Publication No. 2007 0209794 A1, herein incorporated by reference.

Mixtures of proppants may further be used.

The gaseous fluid to which the viscosified aqueous fluid containing the suspended proppant is added is preferably either an inert gas, such as nitrogen, carbon dioxide, air, natural gas or a combination thereof. Nitrogen is most preferred. The gaseous fluid comprises at least about 90 volume percent of the fluid in the proppant stage.

A pad fluid may precede the introduction of the proppant stage into the formation. The pad fluid is a gaseous fluid and is introduced into the formation at a pressure sufficient to initiate a fracture. The pad fluid is preferably composed entirely of nitrogen or a mixture of nitrogen. The pad fluid may further contain an aqueous fluid, including the viscosified fluid (with or without proppant) set forth above. Where the pad fluid contains a mixture of gaseous fluid and aqueous fluid, the amount of gaseous fluid in the pad fluid mixture is at least 70, preferably at least 90, more preferably at least 95, volume percent. The pad fluid may further contain one or more proppants. Typically, when present, the ASG of the proppant in the pad fluid is less than the ASG of the proppant present in the proppant stage. In a preferred embodiment, the ASG of the proppant in the pad fluid is less than or equal to 2.25.

The following example is illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

EXAMPLE

A fracturing treatment was proposed for a Niobrara Chalk formation having a depth to middle perforation of 1,034 ft; a bottom hole static temperature of approximately 73° F., a bottom hole fracture pressure of approximately 724 psi; a surface treating pressure (max) of approximately 751 psi; and a fracture gradient of about 0.70 psi/ft. The desired result was a partial monolayer distribution of proppant upon fracture closure. It was determined that the fracturing treatment would require approximately 10,000 pounds of ultra lightweight proppant. The ULW proppant selected was LiteProp™ 108, a thermoplastic ultra lightweight proppant of 14/40 mesh, having an apparent specific gravity of about 1.05, a product of BJ Services Company. The estimated liquid proppant concentration was estimated to be approximately 4 pounds of proppant added per gallon of liquid (ppa). This represents the estimated concentration of proppant needed to accommodate the flow rates of the pumps. Further, the mass of proppant per volume of viscosified liquid fluid was estimated to be 2.77 ppg, the total amount of fluid required for treatment was estimated to be 2500 gallons and the density of viscosified aqueous fluid containing proppant was estimated to be 8.55 lbs/gal.

LiteProp™ 108 was suspended on-site in an aqueous carrier in a mixing unit, the apparent specific gravity ratio of proppant:carrier being about 1.08:1.00, to render a liquid concentration of 4 ppa. A viscosifier was then added to the mixing unit while agitating the slurry. The viscosifier and amount added to the slurry was $C_{18}$ trimethyl quaternary ammonium chloride [3.5 gallons per thousand (gpt) and 50/50 blend of $C_{18}$ trimethyl quaternary ammonium chloride and sodium xylene sulfonate (10.0 gpt). The resultant was proppant suspended in the viscosified aqueous fluid. The proppant suspension was then pumped into the formation while nitrogen was pumped into the wellhead.

Six treatment stages were undertaken at a rate of 25 barrels per minute (bpm). In the first treatment stage, a pad fluid of nitrogen gas and between from about 3 to about 5 gpt of the 50/50 blend of $C_{18}$ trimethyl quaternary ammonium chloride and sodium xylene sulfonate was introduced into the formation. In the stages 2-5, the viscosified proppant suspension was admixed with nitrogen gas at the wellhead, as set forth above. The last treatment stage was a nitrogen flush which did not contain any proppant or surfactant. The parameters of the stages, based on downhole temperatures and pressures, are set forth below in Table I:

TABLE I

| Stage | Downhole Proppant Volume (gal) | Proppant Fluid Conc. (ppa) | Proppant Rate Rate (bpm) | Proppant Rate Dry (ppm) | Proppant Rate Liquid (gpm) | Prop. Vol. Cum. Dry (lbs) | Prop. Vol. Cum. Liquid (gal) | Mitchell Quality*, calc., downhole, % |
|---|---|---|---|---|---|---|---|---|
| 1 | 13,500 | 0 | 1.3 | 0.0 | 0.0 | 0 | 0 | 95.00 |
| 2 | 6,000 | 0.1 | 0.89 | 103.8 | 37.5 | 600 | 217 | 98.00 |
| 3 | 10,000 | 0.2 | 1.77 | 205.4 | 74.2 | 2,600 | 939 | 97.00 |
| 4 | 10,000 | 0.3 | 2.62 | 304.9 | 110.1 | 5,600 | 2022 | 95.00 |
| 5 | 11,000 | 0.4 | 3.45 | 402.2 | 145.2 | 10,000 | 3610 | 93.00 |
| 6 | 672 | 0 | 0 | 0.0 | 0.0 | 10,000 | 2,777 | 100.00 |

*Volume of gas/(volume gas + gel); does not include proppant concentration.

The proppant fluid approximates the number of pounds of proppant required to effectuate the desired downhole concentration of proppant. From the dry rate, the effective liquid rate is determined based on the amount of fluid added.

The treatment set forth rendered a partial monolayer distribution of proppant in the fractures upon closure.

From the foregoing, it will be observed that numerous variations and modifications may be effected without departing from the true spirit and scope of the novel concepts of the invention.

What is claimed is:

1. A method of fracturing a subterranean formation comprising introducing a proppant stage into the subterranean formation, wherein the proppant stage is prepared by first suspending an ultra lightweight (ULW) proppant in a viscosified aqueous fluid and then introducing the viscosified aqueous fluid to a gaseous fluid, wherein the gaseous fluid constitutes at least about 85 volume percent of the combination of gaseous fluid and aqueous fluid in the proppant stage.

2. The method of claim 1, wherein the amount of proppant particulates suspended in the viscosified aqueous fluid is that sufficient to create a partial monolayer of proppant in the fracture.

3. The method of claim 2, wherein at least 95 percent of the proppant particulates in the partial monolayer are not in contact with other proppant particulates.

4. The method of claim 1, wherein the gaseous fluid is nitrogen, carbon dioxide or a combination thereof.

5. The method of claim 1, wherein the apparent specific gravity of the ULW proppant is less than or equal to 2.25.

6. The method of claim 5, wherein the apparent specific gravity of the ULW proppant is less than or equal to 1.25.

7. The method of claim 6, wherein the apparent specific gravity of the ULW proppant is less than or equal to 1.06.

8. The method of claim 1, wherein the viscosified aqueous fluid contains a viscosifying agent selected from the group consisting of polysaccharides, polyvinyl alcohols, polyacrylates, polypyrrolidones and polyacrylamides and mixtures thereof.

9. The method of claim 8, wherein the viscosifying agent is a polysaccharide selected from the group consisting of guar gums, guar derivatives, cellulose, starch, and galactomannan gums.

10. The method of claim 9, wherein the polysaccharide is crosslinked.

11. The method of claim 1, wherein the viscosified aqueous fluid contains at least one viscoelastic surfactant.

12. The method of claim 1, wherein the viscosified aqueous fluid contains, as a viscosifying agent, the combination of at least one anionic surfactant and at least one cationic surfactant.

13. The method of claim 12, wherein the anionic surfactant is sodium xylene sulfonate and the cationic surfactant is N,N,N-trimethyl-1-octadecammonium chloride.

14. The method of claim 1, wherein the gaseous fluid constitutes at least about 90 volume percent of the combination of gaseous fluid and aqueous fluid in the proppant stage.

15. The method of claim 14, wherein the gaseous fluid constitutes greater than 95 volume percent of the combination of gaseous fluid and aqueous fluid in the proppant stage.

16. The method of claim 15, wherein the gaseous fluid constitutes greater than 97 volume percent of the combination of gaseous fluid and aqueous fluid in the proppant stage.

17. A method of fracturing a subterranean formation comprising:
pumping a pad fluid comprising a gaseous fluid into the formation at a pressure sufficient to initiate a fracture;
introducing a proppant stage into the fracture, wherein the proppant stage comprises gaseous fluid and an ultra lightweight (ULW) proppant suspended in a viscosified aqueous system and further wherein the gaseous fluid comprises greater than 95 volume percent of the fluid in the proppant stage.

18. The method of claim 17, wherein the pad fluid comprises a gaseous fluid and an aqueous fluid.

19. The method of claim 18, wherein the pad fluid comprises a mixture of gaseous fluid and viscosified aqueous fluid, wherein the gaseous fluid of the pad fluid mixture comprises at least 70 volume percent of the mixture.

20. The method of claim 19, wherein the gaseous fluid of the pad fluid mixture comprises at least 90 volume percent of the mixture.

21. The method of claim 20, wherein the pad fluid further contains a proppant.

22. The method of claim 21, wherein the proppant in the pad fluid has an apparent specific gravity less than or equal to 2.25.

23. A method of fracturing a subterranean formation comprising:
pumping a pad fluid comprising a gaseous fluid into the formation at a pressure sufficient to initiate a fracture; and
introducing a proppant stage into the fracture, wherein the proppant stage comprises gaseous fluid and an ultra lightweight (ULW) proppant having an apparent specific gravity (ASG) less than or equal to 2.25 suspended in a viscosified aqueous system and further wherein the gaseous fluid of the proppant stage is greater than 95 volume percent of the fluid in the proppant stage.

24. The method of claim 23, wherein the pad fluid comprises a gaseous fluid and an aqueous fluid.

25. The method of claim 24, wherein the pad fluid comprises a mixture of gaseous fluid and viscosified aqueous fluid, wherein the gaseous fluid of the pad fluid comprises at least 70 volume percent of the mixture.

26. The method of claim 25, wherein the gaseous fluid of the pad fluid mixture comprises at least 90 volume percent of the mixture.

27. The method of claim 26, wherein the pad fluid further contains a proppant.

28. The method of claim 27, wherein the proppant in the pad fluid has an ASG less than or equal to 2.25.

29. A method of fracturing a subterranean formation comprising:
pumping a pad fluid comprising a gaseous fluid into the formation at a pressure sufficient to initiate a fracture; and
introducing a proppant stage into the fracture, wherein the proppant stage comprises gaseous fluid and an ultra lightweight (ULW) proppant suspended in aqueous brine having a specific gravity of near neutral buoyancy with the proppant, and further wherein the gaseous fluid comprises at least about 90 volume percent of the fluid in the proppant stage.

30. The method of claim 29, wherein the pad fluid comprises a gaseous fluid and an aqueous fluid.

31. The method of claim 29, wherein the pad fluid comprises a mixture of gaseous fluid and viscosified aqueous fluid, wherein the gaseous fluid of the pad fluid comprises at least 70 volume percent of the mixture.

32. The method of claim 31, wherein the gaseous fluid of the pad fluid mixture comprises at least 90 volume percent of the mixture.

33. The method of claim 29, wherein the pad fluid further contains a proppant.

34. The method of claim 33, wherein the proppant in the pad fluid has an apparent specific gravity less than or equal to 2.25.

35. A method of fracturing a subterranean formation comprising pumping into the formation a proppant stage, wherein the proppant stage comprises gaseous fluid and an ultra lightweight (ULW) proppant suspended in a surfactant gelled aqueous system and further wherein the gaseous fluid comprises at least about 85 volume percent of the fluid in the proppant stage, the amount of proppant suspended in the surfactant gelled aqueous system being that amount sufficient to create a partial monolayer in the fracture.

36. The method of claim 35, wherein gaseous fluid comprises at least 90 volume percent of the fluid in the proppant stage.

37. The method of claim 35, wherein the apparent specific gravity of the ULW proppant is less than or equal to 2.25.

38. The method of claim 37, wherein the apparent specific gravity of the ULW proppant is less than or equal to 1.25.

39. The method of claim 38 wherein the apparent specific gravity of the ULW proppant is less than or equal to 1.06.

40. A method of fracturing a subterranean formation comprising pumping into the formation a proppant stage, wherein the proppant stage comprises gaseous fluid and an ultra lightweight (ULW) proppant suspended in a viscosified aqueous system and further wherein the gaseous fluid comprises at least about 90 volume percent of the fluid in the proppant stage, the amount of proppant suspended in the viscosified aqueous system being that amount sufficient to create a partial monolayer in the fracture.

41. The method of claim 40, wherein the apparent specific gravity of the ULW proppant is less than or equal to 2.25.

42. The method of claim 41, wherein the apparent specific gravity of the ULW proppant is less than or equal to 1.25.

43. The method of claim 42, wherein the apparent specific gravity of the ULW proppant is less than or equal to 1.06.

44. A method of fracturing a subterranean formation which comprises:
(a) pumping into the wellbore penetrating the subterranean formation a gaseous pad fluid at a pressure sufficient to initiate a hydraulic fracture in the formation; and
(b) pumping a mixture of a gaseous fluid and a slurry of an ultra-lightweight (ULW) proppant in an aqueous fluid into the initiated fracture, said mixture comprised of at least 90 percent by volume of gaseous fluid.

45. The method of claim 44, wherein the amount of ULW proppant placed in the hydraulic fracture is sufficient to create a partial monolayer.

46. The method of claim 44, wherein prior to pumping the mixture of gaseous fluid and slurry into the fracture, a viscosified aqueous fluid is mixed into the gaseous pad fluid at a ratio of less than 10 percent by volume of the gaseous pad fluid.

47. A method of stimulating production of hydrocarbons in an oil or gas well by creating a partial monolayer of proppant in the formation, the method comprising:

injecting simultaneously into a wellbore penetrating the subterranean formation a proppant stage which comprises:
(1) a gaseous fluid; and
(2) an ultra lightweight (ULW) proppant suspended in a viscosified aqueous fluid;
wherein the gaseous fluid constitutes at least about 90 volume percent of the combination of gaseous fluid and aqueous fluid in the proppant stage; and further wherein the viscosified aqueous fluid contains at least one viscoelastic surfactant.

* * * * *